Figure 1:
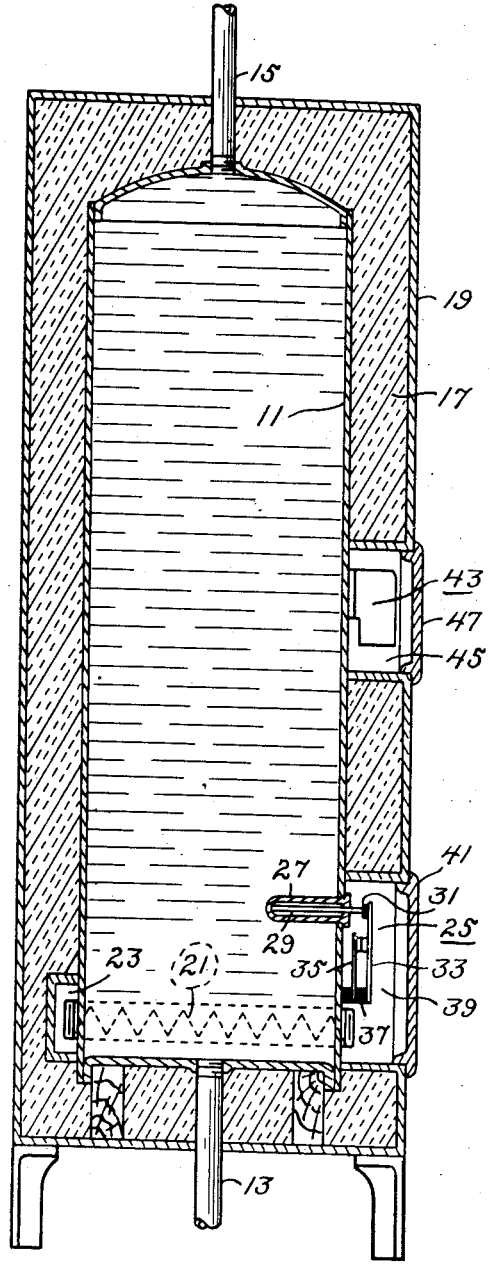

April 10, 1945.  C. M. OSTERHELD  2,373,196
WATER HEATER CONTROL SYSTEM WITH THERMAL RETARDER
Filed Feb. 21, 1944  2 Sheets-Sheet 1

INVENTOR.
CLARK M. OSTERHELD
BY
ATTORNEY

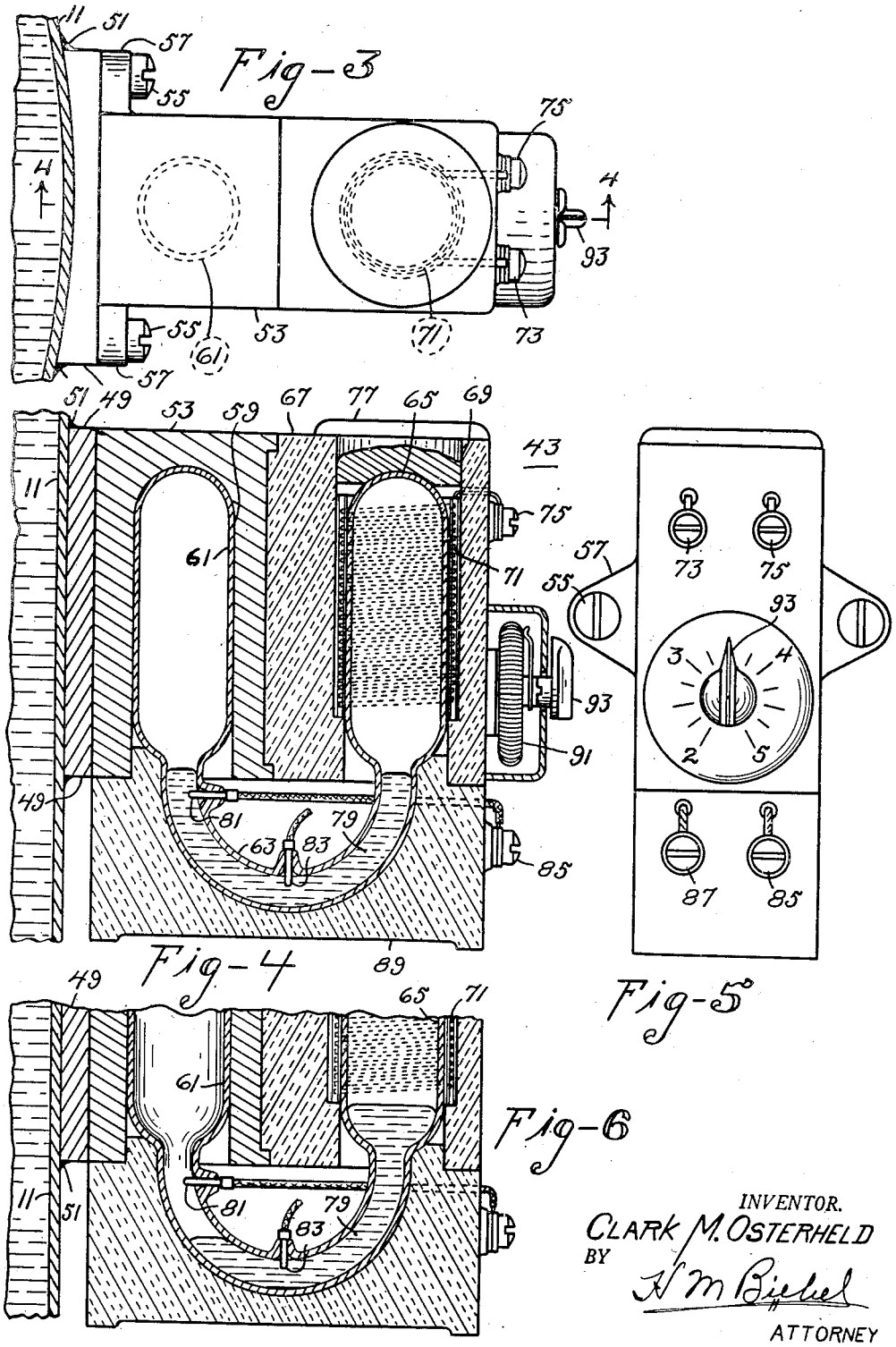

Patented Apr. 10, 1945

2,373,196

UNITED STATES PATENT OFFICE 2,373,196

WATER HEATER CONTROL SYSTEM WITH THERMAL RETARDER

Clark M. Osterheld, Stoughton, Wis., assignor to McGraw Electric Company, Elgin, Ill., a corporation of Delaware Application February 21, 1944, Serial No. 523,322

14 Claims. (Cl. 219—39)

My invention relates to electric heating and particularly to thermal retarder heater control switch units for tank water heaters.

An object of my invention is to provide a control system for the electric heater for a hot water tank including a thermal heater control switch and a thermal retarder heater control switch unit comprising a pair of connected chambers having a fluid conducting medium therein.

Another object of my invention is to provide a thermal retarder heater control switch unit adapted to cause immediate energization of the electric heater on a hot water tank in case of withdrawal of a relatively large quantity of hot water from the tank and to cause energization of the electric heater with an adjustably predetermined time period of delay in case of withdrawal of a relatively small quantity of hot water from the tank.

Another object of my invention is to provide a control system for an electric heater on a hot water tank that shall be effective to cause de-energization of the electric heater when substantially all of the water in the tank is hot.

Figure 2:
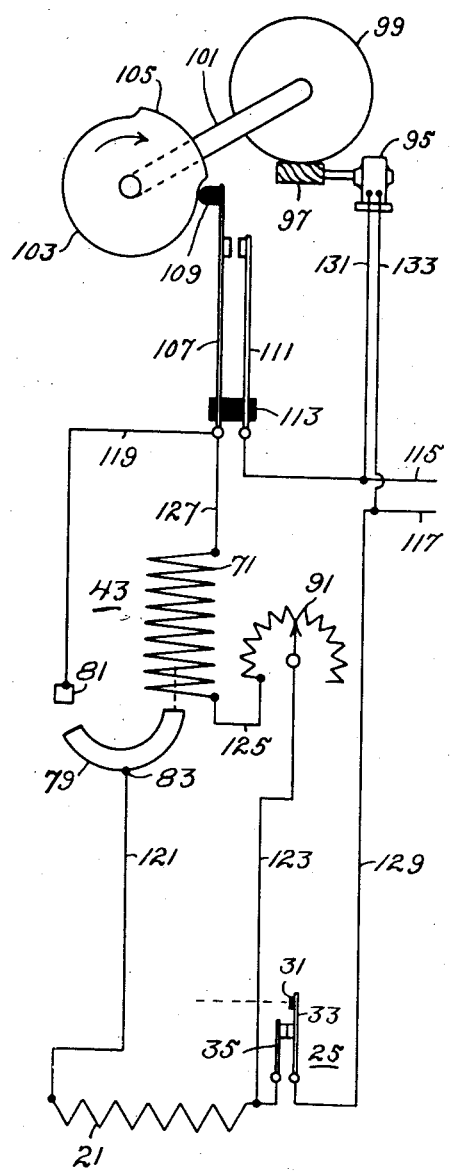

In the drawings,

Figure 1 is a vertical sectional view of an ordinary domestic hot water tank showing schematically the positions of the thermal retarder switch unit, of the lower thermal heater control switch, and of the heater, Fig. 2 is a diagram of electric circuits including an off-peak time switch, a thermal retarder switch unit, and a thermal heater control switch shown in the positions they will occupy when the upper portion of the tank is full of hot water and the lower portion of the tank is full of cold water during an on-peak period, Fig. 3 is a top plan view of the thermal retarder shown in Fig. 4, Fig. 4 is a vertical sectional view on the line 4—4 of Fig. 3, the position of the contacts and of the electric conducting fluid being those occupied when the thermal retarder switch unit is subject to cold water, Fig. 5 is a front view of the parts shown in Fig. 4, and, Fig. 6 is a fragmentary view of Fig. 4 showing the position of the electric conducting fluid when the thermal retarder is subject to hot water.

Referring first to Fig. 1 of the drawings, I have there shown a usual domestic hot water tank 11 which comprises a lower cold water inlet pipe 13, an upper hot water outlet pipe 15, and which has a mass of heat insulation 17 therearound, which latter is held in proper operative position on tank 11 as by an outer casing 19.

I provide preferably, but not necessarily, a single electric heater 21 which may be of the clamp-on type and which may be located in a tunnel 23. All of these details are now well known in the art and constitute no part of my present invention.

I provide a lower thermal heater control switch 25 which comprises a tube 27 having a closed inner end and having its open outer end secured in a fluid tight manner in an opening in tank 11 near to the lower end of the tank. An expansion rod 29 is positioned in the tube 27 and is adapted to engage with and be disengaged from a lug 31 of electric-insulating material secured to the free end of a resilient contact arm 33, which is adapted to engage with and be disengaged from a substantially rigid contact arm 35. The two contact arms may be supported by two blocks 37 of electric-insulating material. It is to be noted that I have shown this thermal switch schematically only and any other structure effective for the same purpose may be utilized. When tube 27 is surrounded by cold water, having a temperature of 70° F., the length of rod 29 will be such that it is out of engagement with lug 31 so that the two contact arms are in engagement with each other, and when tube 27 is subject to hot water having a temperature on the order of 150° F., the length of rod 29 is such that the two contact arms will be out of engagement with each other. The thermal switch 25 may be located in an opening 39, in outer casing 19, which may be closed by a cover 41.

A thermal retarder heater control switch unit designated by numeral 43 is located in heat receiving relation on tank 11, and while I may locate it in any position intermediate the ends of the tank, I preferably locate it at substantially mid-height of the tank in an opening 45 in the heat-insulating mass 17, which opening may be closed by a cover 47.

Referring now to Figs. 3 to 6 inclusive, I have there shown the details of my invention relating to a thermal retarder heater control switch unit 43. I provide a supporting block 49 of a suitable heat-conducting material, the inner surface of which is of arcuate shape so that it will correspond with the outer arcuate surface of tank 11. I may secure support 49 in its proper operative position on tank 11 as by welding seams 51. A heat-conducting member 53 has its inner surface such as to correspond with the outer surface of supporting block 49, the two members being held as by means of a pair of short machine screws 55 extending through lugs 57 on member 53. Member 53 is provided with a central opening 59 therein, which opening is adapted to receive one end portion 61 of a member 63 of substantially U-shape, which is made of a suitable electric non-conducting material and is provided with a second end portion 65 in addition to the first end portion 61, which latter fits in the opening 59 in block 53.

A block 67 of heat-insulating material is provided with a central opening 69 extending therethrough from top to bottom thereof, and the second end portion 65 of the member 63 of U-shape is adapted to be positioned in opening 69. Any suitable or desired means may be provided for securing block 67 in proper operative position against and relative to block 53. The size of opening 69 is slightly greater than that of the outside dimension of end portion 65, and a small heating coil 71 is adapted to fit between the outer surface of end portion 65 and the inner surface of opening 69. The terminals of heating coil 71 may be secured to contact terminals 73 and 75 secured to the front surface of block 67. A cover member 77 may be provided for opening 69.

I provide a mass of fluid electric-conducting material 79, which material is adapted to be positioned in the lower portion of the tubular member 63 and preferably the size of the tube at the intermediate portion is made smaller than the end portions thereof. I provide a pair of spaced contact members 81 and 83, member 81 being adapted to project through the wall of the upper left hand end portion of the intermediate part of tube 63, while the member 83 may extend through the lowermost part of the intermediate portion of tube 63. The end portion 61 is filled with heat-vaporizable material which will vaporize at or about the temperature of hot water in the tank so that the lever of the mass of electric-conducting material 79 in the left hand portion of the intermediate part of the tube will be forced downwardly into substantially the position shown in Fig. 6 of the drawings. The portion 65 of the tube 63 is filled with heat-vaporizable material which will vaporize at or about a temperature of 300° F., with the result that the level of the electric-conducting fluid 79 will be forced downwardly from the position shown in Fig. 6 to the position shown in Fig. 4. Thus in case the heating coil 71 is not energized or has been energized for less than a predetermined period of time necessary to raise the temperature of the material in portion 65 to a value approaching 300° F., and the left hand portion 61 is subject to a temperature on the order of 150° F., the circuit controlled by the two contact members 81 and 83 will be opened. In case the temperature of both portions 61 and 65 is on the order of ordinary room temperature, the circuit controlled by the two contacts 81 and 83 will be closed, which will also be the case if the temperature of portion 61 is on the order of 150° F. and the temperature of the right hand portion 65 is on the order of 300° F. The two contacts 81 and 83 may be connected to contact terminals 85 and 87 suitably secured to the front surface of block 67. The lower or intermediate portion of member 61 may be encased in a block 89 of heat-insulating material.

While it is usually unnecessary to provide means for varying the length of time required by heating coil 71 to cause rise of temperature of end portion 65 to a value on the order of 300° F. or over, I may provide means for varying this length of time, which means may include an adjustable rheostat 91 mounted against the front surface of block 67 and provided with an adjusting knob 93 to permit of varying the length of time, as may be found necessary in actual use of the thermal retarder heater control switch unit.

Referring now to Fig. 2 of the drawings, I have there illustrated a diagram of connections which may be used with my improved thermal retarder heater control switch unit 43. I provide a time controlled switch comprising an electric motor 95 having a worm 97 on its rotor shaft. This worm 97 is adapted to mesh with and drive a worm gear 99, which gear is positioned on the end of a shaft 101, which shaft has a cam disc 103 secured on the other end. The general design, construction, and operation of the structure thus far described is that cam disc 103 is rotated through one complete turn in twenty-four hours by the continuously operative motor 95. The cam disc 103 is provided with a reduced peripheral portion 105 having a larger radius, the peripheral extent of portion 105 being substantially equal to that of an off-peak period. Such off-peak period is considered by many utilities to start at 12 midnight and to end at 6 a. m. so that the peripheral extent of portion 105 will be 90° or one quarter of the total peripheral of cam disc 103.

I provide a circuit switch comprising a resilient contact arm 107, having a lug 109 of electric-insulating material on its outer free end, this lug 109 being normally adapted to engage the surface of cam disc 103. When the lug 109 rests upon the portion 105 of cam disc 103, the arm 107 will be moved in a clockwise direction and into engagement with a rigid contact arm 111. The two arms 107 and 111 may be held in their proper operative positions relative to each other and to cam disc 103 as by blocks 113 of electric-insulating material. The design and construction of the time controlled switch is such that the switch is held in closed position during any off-peak period, which is generally during late night hours, while during the daytime and during the early night hours this switch is open.

I provide a pair of supply circuit conductors 115 and 117, conductor 115 being connected to rigid contact arm 111. Resilient contact arm 107 is connected by conductor 119 to contact member 81 of the thermal retarder switch unit. The second contact 83 is connected by a conductor 121 to one terminal of electric heater 21, the other terminal of which is connected to rigid contact arm 35 and by a conductor 123 to one terminal of adjustable rheostat 91. The other terminal of rheostat 91 is connected by a conductor 125 with one terminal of heating coil 71, the other terminal of which is connected by a conductor 127 to contact arm 107. Contact arm 33 is connected by a conductor 129 to the second supply circuit conductor 117. Motor 95 is connected by conductors 131 and 133 with supply circuit conductors 115 and 117.

Let it now be assumed that the tank is first filled with cold water during an off-peak period so that the circuit switch controlled by the timer is in closed position. The subjection of end portion 61 of the thermal retarder heater control switch unit to cold water and the end portion 65 to room temperature results in the closure of the circuit comprising contacts 81 and 83 and the electric-conducting material 79, as shown in Fig. 4 of the drawings. Also the subjection of rod 29 to the temperature of cold water causes engagement of the contact arms 33 and 35 with the result that an energizing circuit through heater 21 is immediately established. This circuit may be traced as follows: from supply circuit conductor 115 through engaged contact arms 111 and 107, conductor 119, contact 81, electric-conducting fluid 79, contact 83, contactor 121, heater 21, engaged contact arms 35 and 33, and through conductor 129 to the second supply circuit conductor 117. The heating coil 71 will also be energized, which circuit may be traced as follows: from supply circuit 115 through engaged contact arms 111 and 107, conductor 127, heating coil 71, conductor 125, rheostat 91, conductor 123, engaged contact arms 35 and 33, and through conductor 129 to the second supply circuit conductor 117.

Heating of the second portion 65 of the thermal retarder unit to a maximum temperature on the order of 300° F. will be effected in a period of time on the order of five hours or more or less in accordance with the adjustment of rheostat 91. When starting with a tank filled with cold water, the temperature of the water will be substantially uniform from top to bottom of the tank, and this temperature will increase with lapse of time until the temperature of all of the water in the tank has reached the desired maximum, which as stated hereinbefore, may be considered to be on the order of 150° F. For illustrative purposes, it may be mentioned that the total length of time required to heat all of the water in the tank is on the order of six hours. The electric-conducting fluid 79 will therefore remain in substantially the position shown in Fig. 4 so that the energization of heater 21 will not be interrupted until all of the water in the tank is hot. When this condition obtains, the lower thermal switch 25 will be effective to interrupt the energization of heater 21, and the heating coil 71 will also be deenergized with the resulting cooling of portion 65, which permits the electric-conducting fluid 79 to move to the position shown in Fig. 6.

Let it now be assumed that substantially all of the water in the tank was hot by the time that the circuit switch was opened at the end of an off-peak period. Let it be further assumed that only a relatively small quantity of water is withdrawn during the daylight hours and during the early night hours so that only the lower thermal heater control switch 25 is subject to cold water just before the start of an off-peak period. As soon as contact arms 107 and 111 are in engagement at the start of an off-peak period, energization of the low-wattage heating coil 71 will be started and will continue until the temperature of portion 65 has been raised to a value on the order of 300° F., with the result that the electric-conducting fluid 79 will be moved from the position shown in Fig. 6 back to the position shown in Fig. 4 thereof, with the result that energization of heater 21 will start and continue for the rest of the off-peak period.

In case such an amount of hot water was withdrawn from the tank during daylight hours and during early night hours that the thermal retarder switch unit was also subject to cold water, the position of the electric conducting fluid 79 would be that shown in Fig. 4 of the drawings. If this condition occurred early in the evening, the energizing circuit through heater 21 would still be open and would not be closed until engagement of the timer controlled contact arms 107 and 111 at the start of an off-peak period. Energization of the heater 21 would therefore begin at the start of an off-peak period and continue until all of the water in the tank is hot, when the lower thermal switch 25 will open the circuit.

In case the time controlled switch is not provided, the same comments as made hereinbefore will apply, with the exception that energization of heater 21 will begin immediately upon subjection of the thermal retarder heater control switch unit to cold water or will begin a predetermined time period of delay after subjection of the lower thermal heater control switch to cold water.

Various modifications may be made in the device and system embodying my invention without departing from the spirit and scope thereof, and all such modifications coming clearly within the appended claims shall be considered a part of my invention.

I claim as my invention:

1. A water heater control system for a hot water tank having an electric heater and a thermal retarder heater control switch unit comprising a closed tube of U-shape having an electric-conducting fluid in its intermediate portion and thermally expansible substances in the respective end portions, a heat-conductive enclosure for one of said end portions adapted to be secured in heat-receiving relation to a hot water tank intermediate the ends thereof, a heat-insulating enclosure for the other of said end portions, an electric heating coil around said other end portion and a pair of electric contact members in said intermediate portion of said tube adapted to be connected in series circuit with said electric heater, said contact members being electrically connected by said electric-conducting fluid when the temperatures of said end portions of the tube are at substantially ordinary room temperature.

2. A water heater control system for a hot water tank having an electric heater and a thermal retarder switch unit comprising a closed tube of U-shape having an electric-conducting fluid in its intermediate portion and thermally-expansible substances in the respective end portions, a heat conductive enclosure for one of said end portions adapted to be secured in heat-receiving relation to a hot water tank intermediate the ends thereof, a heat-insulating enclosure for the other of said end portions, an electric heating coil around said other end portions, and a pair of electric contact members in said intermediate portion of said tube adapted to be connected in series circuit with said electric heater, said contact members being electrically connected by said electric conducting fluid when the two end portions of said tube are at substantially room temperature.

3. A water heater control system for a hot water tank having an electric heater and a thermal retarder heater control switch unit comprising a closed tube of U-shape having an electric-conducting fluid in its intermediate portion and thermally-expansible substances in the respective end portions, a heat-conductive enclosure for one of said end portions adapted to be secured in heat-receiving relation to a hot water tank intermediate the ends thereof, a heat-insulating enclosure for the other of said ends portions, an electric heating coil for said other end portion and a pair of electric contact members in said intermediate portion of said tube adapted to be connected in series circuit with said electric heater, said contact members being electrically connected by said electric-conducting fluid when the first end portion of said tube is subject to the temperature of cold water in the tank and said second portion of the tube is at substantially ordinary room temperature.

4. A water heater control system for a hot water tank having an electric heater and a thermal retarder heater control switch unit comprising a closed tube of U-shape having an electric-conducting fluid in its intermediate portion and thermally-expansible substances in the respective end portions, a heat-conductive enclosure for one of said end portions adapted to be secured in heat-receiving relation to a hot water tank intermediate the ends thereof, a heat-insulating enclosure for the second end portion, an electric heating coil around said second end portion and a pair of electric contact members in said intermediate portion of said tube adapted to be connected in series circuit with said electric heater, said contact members being electrically connected by said electric-conducting fluid when the first end portion of said tube is subject to the temperature of cold water in the tank and the second portion of the tube is at substantially ordinary room temperature and said contact members being electrically disconnected by said electric-conducting fluid when enough water in the tank has been heated to a predetermined high temperature to subject said first end portion to the temperature of said heated water and the temperature of said second end portion is at substantially ordinary room value.

5. A water heater control system for a hot water tank having an electric heater and a thermal retarder heater control switch unit comprising a closed tube of U-shape having an electric-conducting fluid in its intermediate portion and thermally-expansible substances in the respective end portions, a heat-conductive enclosure for one of said end portions adapted to be secured in heat-receiving relation to a hot water tank intermediate the ends thereof, a heat-insulating enclosure for the second end portion, an electric heating coil for said second end portion and a pair of electric contact members in said intermediate portion of said tube adapted to be connected in series circuit with said electric heater, said contact members being electrically connected by said electric-conducting fluid when the first end portion of said tube is subject to the temperature of cold water in the tank and said second portion of the tube is at substantially ordinary room temperature and said contact members being electrically disconnected by said electric-conducting fluid when said first end portion of the thermal retarder switch unit is subject to hot water and the temperature of said second end portion is at substantially ordinary room value and said contact members being adapted to be electrically connected with a predetermined time period of delay when said first end portion is subject to hot water in the tank and the heating coil for said second end portion has been energized.

6. A thermal retarder heater control switch unit for controlling the energization of an electric heater for a hot water tank, comprising a closed tube of electric-insulating material and of substantially U-shape having an electric-conducting fluid in its intermediate portion and thermally-expansible substances in the respective end portions, a heat-conductive enclosure for one of said end portions adapted to be secured in good heat-conducting relation to the outside of a hot water tank intermediate the ends thereof, a heat-insulating enclosure for the other end portion supported by said heat-conductive enclosure, an electric heating coil for said other end portion and a pair of spaced contact members in said intermediate portion adapted to be connected in series circuit with said electric heater, said contact members being electrically connected by said electric-conducting fluid when the temperatures of both said end portions are at substantially the same low value and when the temperatures of both end portions are at predetermined relatively high values.

7. A thermal retarder switch unit for controlling the energization of an electric heater for a hot water tank, comprising a closed tube of electric insulating material and of substantially U-shape having an electric-conducting fluid in its intermediate portion and thermally-expansible substances in the respective end portions, a heat-conductive enclosure for one of said end portions adapted to be secured in good heat-conducting relation to the outside of a hot water tank intermediate the ends thereof, a heat-insulating enclosure for the other end portion supported by said heat-conductive enclosure, an electric heating coil around said other end portion and a pair of spaced contact members in said intermediate portion adapted to be connected in series circuit with said electric heater, said contact members being electrically disconnected by said electric-conducting fluid when said one end portion is subject to the temperature of hot water in the tank and said other end portion is at substantially ordinary room temperature.

8. A thermal retarder switch unit for controlling the energization of an electric heater for a hot water tank, comprising a closed tube of electric insulating material and of substantially U-shape having an electric-conducting fluid in its intermediate portion and thermally-expansible substances in the respective end portions, a heat-conductive enclosure for one of said end portions adapted to be secured in good heat-conducting relation to the outside of a hot water tank intermediate the ends thereof, a heat-insulating enclosure for the other end portion supported by said heat-conducting enclosure, an electric heating coil around said other end portion and a pair of spaced contact members in said intermediate portion adapted to be connected in series circuit with said electric heater, said contact members being electrically disconnected by said electric-conducting fluid when said one end portion is subject to the temperature of hot water in the tank and the heating coil for the other end portion has been energized for less than a predetermined length of time.

9. A water heater control system for a domestic hot water tank subject to withdrawals of hot water during a twenty-four hour day, comprising an electric heater adapted to be energized from an electric supply circuit having reduced demands for energy during late night hours, a thermally-responsive heater control switch subject to tank water temperature at the lower end portion of the tank and a thermal retarder heater control switch unit adapted to be mounted on a tank intermediate its ends and including a closed tube of electric-insulating material and of U-shape having an electric-conducting fluid in its intermediate portion, thermally-expansible substances in the respective end portions, a heat-conducting enclosure for one of said end portions adapted to be secured in good heat-conducting engagement with the outside of a tank intermediate the ends thereof, a heat-insulating enclosure for the other end portion, a heating coil around the other end portion and a pair of spaced contact members in said intermediate portion adapted to be connected in series circuit with said electric heater, a continuously operative timer and a heater circuit switch adapted to be closed by said timer during said period of reduced demand, all of said heater control switches being jointly effective to cause energization of said electric heater simultaneously with the closing of said circuit switch in case the thermal retarder is subject to cold water in the tank.

10. A water heater control system for a domestic hot water tank subject to withdrawals of hot water during a twenty-four hour day, comprising an electric heater adapted to be energized from an electric supply circuit having reduced demands for energy during late night hours, a thermally-responsive heater control switch subject to tank water temperature at the lower end portion of the tank and a thermal retarder heater control switch unit adapted to be mounted on a tank intermediate the ends thereof and including a closed tube of electric-insulating material and of U-shape having an electric-conducting fluid in its intermediate portion, thermally-expansible substances in the respective end portions, a heat-conducting enclosure for one of said end portions adapted to be secured in good heat-conducting engagement to a tank intermediate the ends thereof, a heat-insulating enclosure for the other end portion, a heating coil for the other end portion and a pair of spaced contact members in said intermediate portion adapted to be connected in series circuit with said electric heater, a continuously operative timer and a heater circuit switch adapted to be closed by said timer during said period of reduced demand, all of said heater control switches being jointly effective to cause energization of said electric heater with a predetermined time delay period after closing of said circuit switch by said timer in case the thermal retarder is subject to hot water in the tank.

11. A water heater control system for a domestic hot water tank subject to withdrawals of hot water during a twenty-four hour day, comprising an electric heater adapted to be energized from an electric supply circuit having reduced demands for energy during late night hours, a thermally-responsive heater control switch subject to tank water temperature at the lower end portion of the tank and a thermal retarder heater control switch unit adapted to be mounted on a tank intermediate the ends thereof and including a closed tube of electric-insulating material and of U-shape having an electric-conducting fluid in its intermediate portion, thermally-expansible substances in the respective end portions, a heat-conducting enclosure for one of said end portions adapted to be secured in good heat-conducting engagement with the outside of a tank intermediate the ends thereof, a heat-insulating enclosure for the other end portion, a heating coil for said other end portion and a pair of spaced contact members in said intermediate portion adapted to be connected in series circuit with said electric heater, a continuously operative timer and a heater circuit switch adapted to be closed by said timer during said period of reduced demand, all of said heater control switches being jointly effective to cause energization of said electric heater with a predetermined period of time delay after closing of said circuit switch by said timer in case the thermal retarder is subject to hot water in the tank and said thermally-responsive heater control switch being effective to cause deenergization of said heater when the tank is full of hot water.

12. An off-peak water heating system for a hot water tank having an electric heater, comprising a continuously operative timer, a first heater control switch adapted to be moved into and held in closed position by said timer during an off-peak period, a second thermal heater control switch in series circuit with said timer controlled switch and subject to tank water temperature adjacent to the lower portion of the tank and adapted to be moved into closed position when subject to cold water, a third heater control switch in series circuit with said first and second switches and said heater, and means to cause closing of said third switch with a time delay period after start of an off-peak period in case said second switch only is subject to cold water, said means comprising a closed tube of electric-insulating material and of U-shape having an electric-conducting fluid in its intermediate portion and thermally-expansible substances in its end portions, a heat-conducting enclosure for one of said end portions adapted to be mounted in good heat-conducting engagement on a tank intermediate the ends thereof, a heat-insulating enclosure for the other end portion, a heating coil for said other end portion controlled by said time switch and said second switch to be energized of an off-peak period and a pair of contact members in said intermediate portion adapted to be connected by said fluid after a time delay period with attendant energization of the electric heater.

13. An off-speak water heating system for a hot water tank having an electric heater, comprising a continuously operative timer, a first heater control switch adapted to be moved into and held in closed position by said timer during an off-peak period, a second thermal heater control switch in series circuit with said timer controlled switch when subject to tank water temperature adjacent to the lower portion of the tank and adapted to be moved into closed position when subject to cold water, a third heater control switch in series circuit with said first and second switches and said heater, a means to cause closing of said third switch immediately after start of an off-peak period in case said second and third switches are subject to cold water, said means comprising a closed tube of electric-insulating material and of U-shape having an electric-conducting fluid in its intermediate portion and thermally-expansible substances in its end portions, a heat-conducting enclosure for one of said end portions adapted to be secured in good heat-receiving engagement on a tank intermediate the ends thereof, a heat-insulating enclosure for the other end portion, a heating coil for heating said other end portion and controlled jointly by said second switch and said timer switch to be energized at the start of an off-peak period and a pair of contact members in the intermediate portion adapted to be connected by said fluid to cause energization of said heater upon start of an off-peak period.

14. A water heating system as set forth in claim 13 in which said second switch is adapted to open and cause deenergization of said heater when substantially all of the water in the tank is hot.

CLARK M. OSTERHELD.